US010917465B2

(12) United States Patent
Suyama et al.

(10) Patent No.: US 10,917,465 B2
(45) Date of Patent: Feb. 9, 2021

(54) SYNCHRONIZATION SETTING DEVICE AND DISTRIBUTION SYSTEM

(71) Applicant: YAMAHA CORPORATION, Hamamatsu (JP)

(72) Inventors: Akihiko Suyama, Hamamatsu (JP);
Yuki Suemitsu, Hamamatsu (JP);
Katsuaki Tanaka, Hamamatsu (JP);
Takeyoshi Aihara, Hamamatsu (JP);
Fukutaro Okuyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 15/904,653

(22) Filed: Feb. 26, 2018

(65) Prior Publication Data

US 2018/0183870 A1    Jun. 28, 2018

Related U.S. Application Data

(63) Continuation of application No. PCT/JP2016/075437, filed on Aug. 31, 2016.

(30) Foreign Application Priority Data

Jun. 24, 2016 (WO) .................. PCT/JP2016/068835

(51) Int. Cl.
*G06F 15/16* (2006.01)
*H04L 29/08* (2006.01)
(Continued)

(52) U.S. Cl.
CPC .......... *H04L 67/1095* (2013.01); *G05B 15/02* (2013.01); *G06F 3/162* (2013.01);
(Continued)

(58) Field of Classification Search
CPC ... H04L 67/1095; H04L 7/00; H04N 21/4307; G05B 15/02; G06F 3/162; G06F 13/00
(Continued)

(56) References Cited

U.S. PATENT DOCUMENTS 7,512,319 B2 *  3/2009  Miyaki ................ G10H 1/0066
                                                386/201
9,029,676 B2 *  5/2015  Iwase .................. G10H 1/0066
                                                 84/600
(Continued)

FOREIGN PATENT DOCUMENTS

CA       2533852 C    *  4/2014  ......... G06F 3/04847
JP       2001324980 A    11/2001
(Continued)

OTHER PUBLICATIONS

Kumagai, Hayato, Teruhisa Hochin, and Hiroki Nomiya. "Synchronization method for improving temporal harmony of music and video clips." In 2015 3rd International Conference on Applied Computing and Information Technology/2nd , pp. 236-241. IEEE, 2015 (Year: 2015).*
(Continued)

*Primary Examiner* — Liang Che A Wang
(74) *Attorney, Agent, or Firm* — Rossi, Kimms & McDowell LLP

(57) ABSTRACT

A synchronization setting device and a system include at least one memory storing instructions, and at least one processor that implements the stored instructions to acquire first delay time to be set in a first distribution device for distributing first content data, and output the first delay time to the first distribution device or to a reproduction device that provides the first content data to the first distribution device.

12 Claims, 12 Drawing Sheets

(51) Int. Cl.
*G06F 13/00* (2006.01)
*H04L 7/00* (2006.01)
*H04N 21/43* (2011.01)
*G05B 15/02* (2006.01)
*G06F 3/16* (2006.01)

(52) U.S. Cl.
CPC ............... *G06F 13/00* (2013.01); *H04L 7/00* (2013.01); *H04N 21/4307* (2013.01)

(58) Field of Classification Search
USPC .......................................... 709/248–250, 217
See application file for complete search history.

(56) References Cited

U.S. PATENT DOCUMENTS

| | | | |
|---|---|---|---|
| 9,082,382 B2* | 7/2015 | Akiyama | G10H 7/008 |
| 2002/0092411 A1* | 7/2002 | Shiiya | G10H 1/0066 |
| | | | 84/609 |
| 2004/0010727 A1* | 1/2004 | Fujinami | G06F 1/14 |
| | | | 713/400 |
| 2009/0073316 A1 | 3/2009 | Ejima | |
| 2013/0197682 A1* | 8/2013 | Millington | H04N 21/242 |
| | | | 700/94 |
| 2015/0036994 A1 | 2/2015 | Millington | |

FOREIGN PATENT DOCUMENTS

| | | |
|---|---|---|
| JP | 2002215143 A | 7/2002 |
| JP | 2003037585 A | 2/2003 |
| JP | 2004282667 A | 10/2004 |
| JP | 2006339856 A | 12/2006 |
| JP | 2008131589 A | 6/2008 |
| JP | 2010011274 A | 1/2010 |
| JP | 2015018384 A | 1/2015 |

OTHER PUBLICATIONS

Office Action issued in Japanese Appln. No. 2018-523276 dated May 21, 2019. English translation provided.
International Search Report issued in International Application No. PCT/JP2016/068835 dated Sep. 20, 2016. English translation provided.
Written Opinion issued in International Application No. PCT/JP2016/068835 dated Sep. 20, 2016.
International Search Report issued in International Application No. PCT/JP2016/075437 dated Oct. 11, 2016. English translation provided.
Written Opinion issued in International Application No. PCT/JP2016/075437 dated Oct. 11, 2016.
Extended European Search Report issued in European Appln. No. 16906324.5 dated Jan. 27, 2020.
Office Action issued in Chinese Appln. No. 201680086626.6 dated Oct. 12, 2020. English machine translation provided.

* cited by examiner

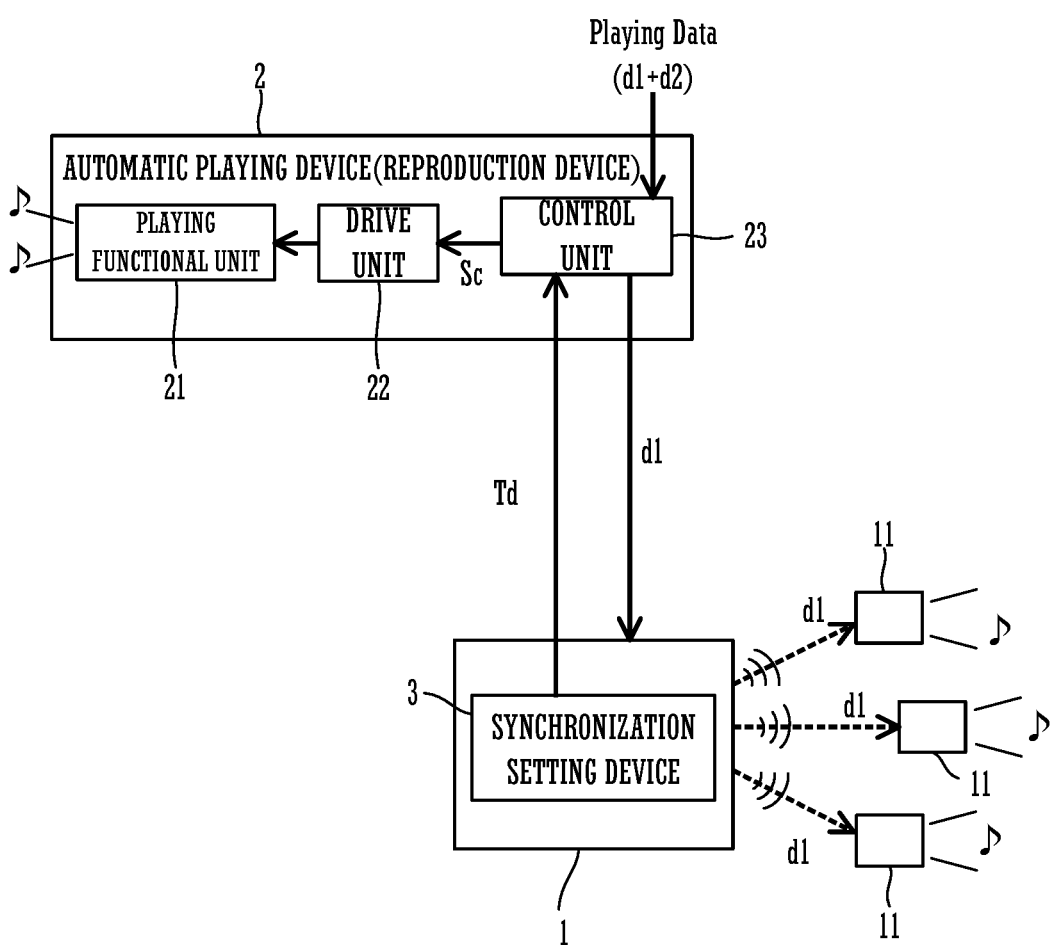

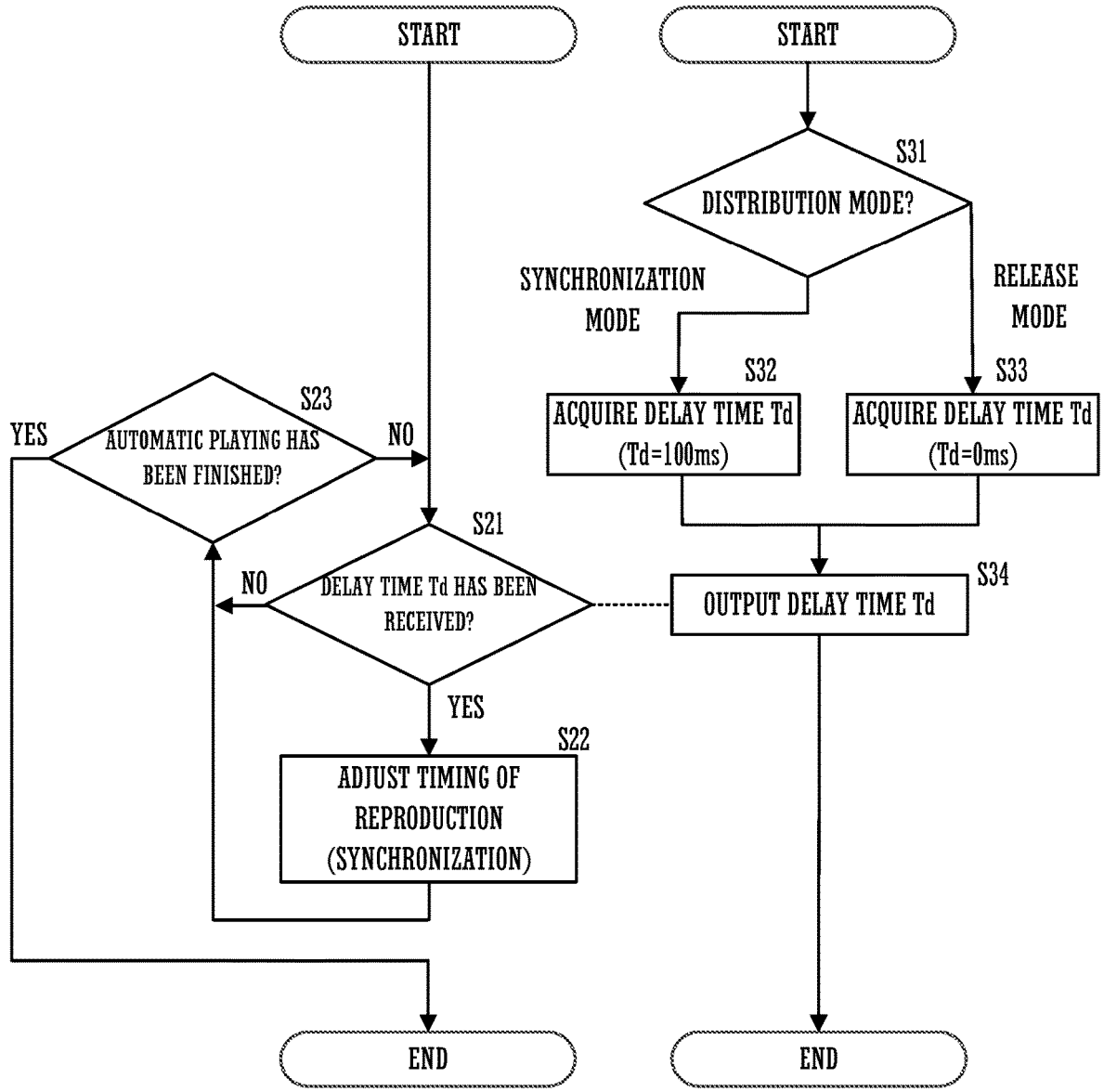

SYNCHRONIZATION SETTING DEVICE AND DISTRIBUTION SYSTEM

CROSS REFERENCE TO RELATED APPLICATIONS

The present application is a Continuation Application of International Patent Application No. PCT/JP2016/075437, filed on 31 Aug. 2016, which claims the benefit of priority to International Patent Application No. PCT/JP2016/068835, filed on 24 Jun. 2016. The entire contents of these applications are hereby incorporated herein by reference.

BACKGROUND OF THE INVENTION

1. Field of the Invention

The present invention relates to a synchronization setting device and a distribution system used for synchronous distribution of content data.

2. Description of Related Art

In a distribution system conventionally known, content data is distributed from a distribution device to a plurality of distribution destinations (output devices, such as speakers, for example) through a network of a digital communication system such as a local area network (LAN). Distributing the content data through the network of the digital communication system requires data processing including encoding and decoding. This unfortunately can delay the distribution and create a difference in delay time between the distribution destinations. In response, a synchronous distribution system has been suggested. See Japanese published unexamined patent application No. 2003-37585, for example. In this synchronous distribution system, synchronization is established between a plurality of distribution destinations, so that outputs from the distribution destinations are timed to each other. This makes contents, such as voice simultaneously output from the distribution destinations. Thus, delay during distribution raises substantially no problem.

As has been the case in recent years, a reproduction device for reproduction of content data sends the content data to at least one distribution device. In some cases, however, reproduction of a content by the reproduction device and an output of a content from the distribution device are not timed to each other, so that synchronization is lost between the reproduction and the output. In other cases, outputs of contents from a plurality of distribution devices are not timed to each other, so that synchronization is lost between the outputs.

SUMMARY OF THE INVENTION

One aspect of the present invention is a synchronization setting device comprising at least one processor and at least one memory storing a plurality of instructions. The at least one processor is configured to implement the stored instructions and execute an acquiring task that acquires a first delay time to be set in a first distribution device for distributing first content data, and an output task that outputs the first delay time to the first distribution device or to a reproduction device that provides the first content data to the first distribution device.

Another aspect is a distribution system that includes the synchronization setting device, at least one distribution device to which a first delay time is settable for distribution of first content data, and a reproduction device that provides the first content data to the first distribution device.

BRIEF DESCRIPTION OF THE DRAWINGS

FIG. 1 is a conceptual view showing a distribution system according to a first embodiment.

FIG. 3 is a flowchart showing control over the distribution system.

DETAILED DESCRIPTION

1. First Embodiment

Figure 2A:
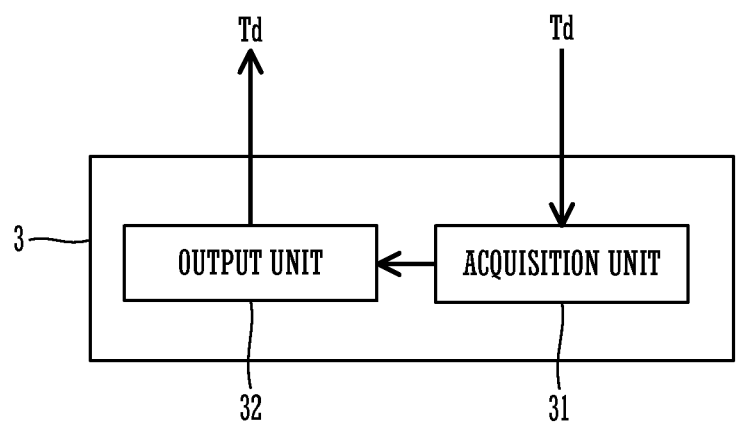
FIG. 2A is a block diagram showing a synchronization setting device in the distribution system.

A first embodiment is intended to solve the following problem. In a distribution system newly suggested in recent years, a reproduction device, as a source of distribution of content data, is connected to a distribution device, provides the content data to the distribution device, and reproduces content data differently from and associated with the provided content data. This new distribution system has the following problem.

In the new distribution system, the reproduction device as a distribution source reproduces the content data to output a content, such as voice, with substantially no delay. Meanwhile, as to the contents to be output from distribution destinations (output devices, such as speakers, for example), these contents are synchronized with each other, but are delayed before being output for the reason given above. Hence, the outputs of the contents from the distribution source (reproduction device) and the distribution destinations are not synchronized with each other. Thus, the delay caused during distribution raises a serious problem in the new distribution system.

A synchronization setting device according to the first embodiment includes an acquisition unit and an output unit. The acquisition unit and the output unit are realized by at least one processor, such as a central processing unit (CPU). The acquisition unit acquires delay time to be set in a distribution device for establishing synchronization of distribution of first content data through a network. The output unit outputs the delay time to a reproduction device that reproduces second content data associated with the first content data.

The synchronization setting device can be incorporated in the distribution device as a master of a network audio system.

A distribution system according to the first embodiment includes the distribution device that distributes the first content data through the network, the reproduction device that reproduces the second content data associated with the first content data, and the synchronization setting device used for acquiring and outputting the delay time to be set in the distribution device for establishing synchronization of distribution of the first content data. The reproduction device adjusts timing of reproduction of the second content data in response to the delay time output from the synchronization setting device.

In this distribution system, the reproduction device can be an automatic playing device and can adjust timing of playing based on the second content data in response to the delay time output from the synchronization setting device.

In this distribution system, the synchronization setting device can be incorporated in the distribution device or in a controller of the distribution device.

1-1. Configuration of Distribution System

FIG. 1 is a conceptual view showing the distribution system according to the first embodiment. As shown in FIG. 1, the distribution system includes a distribution device 1, an automatic playing device 2, and a synchronization setting device 3.

The distribution device 1 is an audio-visual (AV) receiver, for example. The distribution device 1 can distribute first content data d1 to a plurality of distribution destinations, which can be output devices, such as speakers, for example, through a network of a digital communication system, such as a local area network (LAN). In the first embodiment, the first content data d1 contains a content corresponding to an accompaniment part of a tune to be played by the automatic playing device 2. As will be described later, the first content data d1 is output or obtained from the automatic playing device 2 to or by the distribution device 1. The distribution device 1 is not limited to the AV receiver but can be various types of devices usable for distribution of content data. The network can be configured either as a wired network or as a wireless network.

The above-described system of distributing an audio content through the network is generally called a network audio system. In the network audio system, an audio content is distributed from a master (distribution device 1) to a plurality of slaves (distribution destinations 11 such as speakers). Then, the audio content is reproduced while synchronization is established between the master and the slaves, and further between the slaves (synchronous reproduction). In consideration of delay caused during distribution, the delay time Td necessary for the synchronous reproduction is set in the master (distribution device 1). As an example, the first content data d1 can be data containing a content to be reproduced by a network audio system, for example.

The distribution device 1 has a plurality of distribution modes each settable as a way of distributing the first content data d1. In the distribution device 1, the delay time Td for establishing synchronization of distribution of the first content data d1 through the network (specifically, for the synchronous reproduction) is set in advance for each of the distribution modes. The distribution modes include at least a synchronization mode and a release mode. The synchronization mode is intended to establish synchronization between the distribution destinations 11 during distribution of the first content data d1. The release mode is intended to release the distribution destinations 11 from the synchronization.

The automatic playing device 2 is a musical instrument, such as a piano having an automatic playing function, that corresponds to the "reproduction device." The reproduction device illustrated in FIG. 1 has a playing system that outputs a content from the playing system (play music) and also a content from another system within the reproduction device. Alternatively, the reproduction device also can be a device that simply outputs a content to a different device without outputting a content from the reproduction device.

The automatic playing device 2 includes a playing functional unit 21 for playing music, a drive unit 22 that operates the playing functional unit 21, and a control unit 23 that controls the drive unit 22. If the automatic playing device 2 is a piano, for example, a transmission mechanism that transmits the motions of keyboards to hammers corresponds to the playing functional unit 21, and a unit that drives the hammers by mechanically realizing the motions of the keyboards corresponds to the drive unit 22.

The control unit 23 is a control processor, such as a microcomputer. The control unit 23 executes automatic playing processing based on second content data d2 associated with the first content data d1 while providing the first content data d1 to the distribution device 1. More specifically, the control unit 23 generates a control signal Sc used for controlling the drive unit 22 based on the second content data d2, and outputs the generated control signal Sc to the drive unit 22. Based on the control signal Sc from the control unit 23, the drive unit 22 operates the playing functional unit 21. In this way, the automatic playing device 2 reproduces the second content data d2 to output the second content data d2 as piano sound. In this case, the second content data d2 is musical instrument digital interface (MIDI) data containing a content (piano sound) to be emitted from the automatic playing device 2. The second content data d2 is not limited to MIDI data. For example, the second content data d2 can be audio data, such as a voice in Japanese and the first content data d1 can be audio data, such as a voice in English.

The above-described MIDI data is input to the control unit 23. The control unit 23 generates the control signal Sc using data containing a playing part (piano part) to be played by the automatic playing device 2 in the MIDI data as the second content data d2. Further, the control unit 23 drives a sound source (not shown in the drawings) based on data containing another playing part (accompaniment part, for example) in the MIDI data. Then, the control unit 23 provides a digital audio signal obtained from the sound source as the first content data d1 to the distribution device 1.

As described above, the first content data d1 and the second content data d2 contain contents associated with each other. Specifically, the first content data d1 and the second content data d2 are to be reproduced in synchronization with each other.

The automatic playing device 2 is connected to the distribution device 1 through a cable or a network. Specifically, the automatic playing device 2 is connected externally to the above-described network audio system. During execution of the automatic playing processing, the control unit 23 sends the first content data d1 to the distribution device 1. At this time, the first content data d1 in the form of a digital audio signal can be sent as is to the distribution device 1. Alternatively, the first content data d1 can be converted to an analog audio signal and then sent to the distribution device 1. In either case, data processing including encoding and decoding is not required, so that substantially no delay is experienced between the automatic playing device 2 and the distribution device 1.

FIG. 2A is a block diagram showing the synchronization setting device 3. As shown in FIG. 2A, the synchronization setting device 3 includes an acquisition unit 31 and an output unit 32. In the first embodiment, the synchronization setting device 3 is realized in the distribution device 1, as shown in FIG. 1. This is described in more detail below.

Figure 2B:
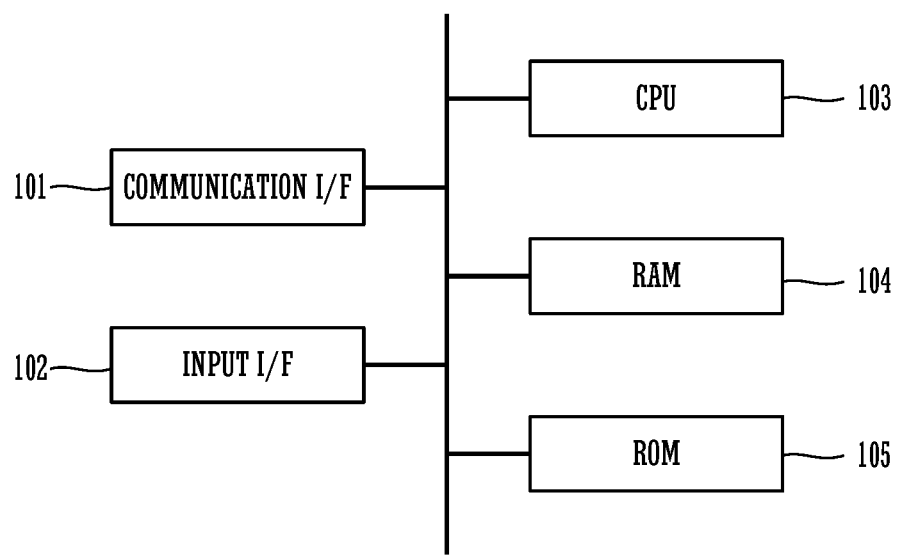
FIG. 2B is a block diagram showing a distribution device in the distribution system.

FIG. 2B is a block diagram showing the hardware configuration of the distribution device 1. As shown in FIG. 2B, the hardware configuration of the distribution device 1 includes a communication interface 101, an input interface 102, a central processing unit (CPU) 103, a random access memory (RAM) 104, and a read only memory (ROM) 105. The CPU 103 executes a program in the RAM 104 or in the ROM 105 to realize the synchronization setting device 3 by software. Therefore, the synchronization setting device 3 realized by software includes at least one processor (for example the CPU 103) and at least one memory (for example the RAM 104 or the ROM 105), and the at least one memory stores a program or a plurality of instructions that are implemented by the at least one processor to realize the acquisition unit 31 and the output unit 32. The program (or instructions) for realizing the synchronization setting device 3 by software can be stored in a recording medium (flash memory, optical disk, or magnetic disk, for example) readable by the distribution device 1.

It should be noted that the control unit 23 also can have the same hardware configuration as FIG. 2.

The acquisition unit 31 acquires the delay time Td to be set in the distribution device 1 for establishing synchronization of distribution of the first content data d1 (for the synchronous reproduction). More specifically, the delay time Td is set for each of the above-described distribution modes (synchronization mode and release mode). In response to a distribution mode set in the distribution device 1, the acquisition unit 31 acquires the delay time Td corresponding to the set distribution mode.

In the first embodiment, the delay time Td is set in advance for each distribution mode in the distribution device 1. The acquisition unit 31 acquires the corresponding delay time Td from the distribution device 1. The delay time Td can be stored in a storage (not shown in the drawings) in the synchronization setting device 3. In this case, the acquisition unit 31 acquires the corresponding delay time Td from the storage. The acquisition unit 31 can actually measure the delay time Td for acquisition of the delay time Td. The delay time Td can be measured by the distribution device 1 or by a measuring unit provided separately.

For example, the delay time Td can be set as follows. For distribution through a wireless network, the delay time Td can be set at 500 ms to correspond to the synchronization mode. For distribution through a wired network, the delay time Td can be set at 100 ms to correspond to the synchronization mode. The delay time Td can be set at 0 (zero) ms to correspond to the release mode. The delay time Td is not limited to these values but can be changed appropriately in a manner that depends on the communication environment.

The output unit 32 outputs the delay time Td acquired by the acquisition unit 31. More specifically, the output unit 32 outputs the delay time Td to the automatic playing device 2. The synchronization setting device 3 has destination information, such as an Internet Protocol (IP) address that provides a destination of output of the delay time Td. The output unit 32 outputs the delay time Td based on the destination information. The synchronization setting device 3 can acquire the destination information by searching for the automatic playing device 2 on the network.

The automatic playing device 2 adjusts timing of playing based on the second content data d2 in response to the delay time Td output from the output unit 32. In other words, the automatic playing device 2 adjusts timing of reproduction of the second content data d2 in response to the delay time Td. Specifically, if the delay time Td is not 0 (zero) ms, the automatic playing device 2 delays reproduction of the second content data d2 in response to the delay time Td, thereby timing outputs of contents from the automatic playing device 2 (distribution source) and the distribution destination 11 to each other to synchronize the outputs. If the delay time Td is 0 (zero) ms, the automatic playing device 2 reproduces the second content data d2 without delay. By doing so, the automatic playing device 2 restores its original timing of reproduction (without delay).

More specifically, the control unit 23 of the automatic playing device 2 adjusts timing of output of the control signal Sc to the drive unit 22. In the first embodiment, the control unit 23 delays timing of output of the control signal Sc to delay reproduction of the second content data d2. At this time, time of delay of reproduction by the automatic playing device 2 can be the same as the delay time Td, or can be determined by correcting the delay time Td so as to establish synchronization with the distribution destination 11.

Instead of delaying the timing of output of the control signal Sc, reproduction of the second content data d2 can be delayed by a method of delaying timing of sequencing of the MIDI data by the control unit 23 or by a method of mechanically delaying timing of playing by the automatic playing device 2 (extending a period from drive of the drive unit 22 to execution of playing by the playing functional unit 21).

1-2. Control Over Distribution System

FIG. 3 is a flowchart showing control executed by the automatic playing device 2 and the synchronization setting device 3. First, in response to input of playing data, such as MIDI data, to the automatic playing device 2, the automatic playing device 2 starts the automatic playing processing. This starts the synchronization setting device 3 to start the synchronization setting processing. The start timing of the synchronization setting processing may not coincide with the start timing of the automatic playing, but it may alternatively coincide with the timing of the occurrence of a delay time change in the distribution device 1.

When the synchronization setting processing is started, the synchronization setting device 3 determines which distribution mode is set in the distribution device 1 (step S31). A user sets a distribution mode using the distribution device 1 or a controller 12 (see FIG. 4) for remote control over the distribution device 1. In the first embodiment, the synchronization setting device 3 determines whether the set distribution mode is the synchronization mode or the release mode. This also applies to the case where the distribution device 1 has three or more settable distribution modes.

After the determination is made in step S31, the acquisition unit 31 of the synchronization setting device 3 acquires the delay time Td corresponding to the distribution mode set in the distribution device 1 (steps S32 and S33). The delay time Td can be acquired by the various methods described above (acquisition from the distribution device 1 or from the storage, or acquisition by measurement, for example).

After acquiring the delay time Td, the output unit 32 of the synchronization setting device 3 outputs the delay time Td to the automatic playing device 2 (step S34). The synchronization setting device 3 has destination information, such as an Internet Protocol (IP) address that provides a destination of output of the delay time Td. In this step, the output unit 32 outputs the delay time Td based on the destination information. The synchronization setting device 3 can acquire the destination information by searching for the automatic playing device 2 on the network.

After starting the automatic playing processing, the automatic playing device 2 determines whether or not it has received the delay time Td (step S21). This determination is made by the control unit 23, for example. Step S22 is repeated until the automatic playing device 2 determines in step S21 that it has received the delay time Td.

If the automatic playing device 2 determines in step S21 that it has received the delay time Td, the automatic playing device 2 adjusts the timing of playing based on the second content data d2 in response to the received delay time Td (step S22). In other words, the automatic playing device 2 adjusts timing of reproduction of the second content data d2 in response to the delay time Td. Thus, outputs of contents from the automatic playing device 2 (distribution source) and the distribution destination 11 are timed to each other to be synchronized. Timing of the reproduction can be adjusted by the various methods described above (by delaying timing of output of the control signal Sc or by making delay mechanically).

Then, the automatic playing device 2 repeats steps S21 and S22 until the automatic playing device 2 determines in step S23 that the automatic playing has been finished.

The distribution system and the control over the distribution system according to the first embodiment allow outputs of contents from the automatic playing device 2 (distribution source) and the distribution destination 11 to be timed to each other to be synchronized. Thus, comfortable playing without a mismatch can be offered to a user at the distribution destination 11. Further, the delay time Td is set in response to the distribution mode set in the distribution device 1. This increases flexibility in adjusting timing of reproduction by the automatic playing device 2.

1-3. First Modification

In the above-described distribution system, a real delay time can change while the automatic playing device 2 is playing or when the automatic playing device 2 starts the next playing. In either case, the acquisition unit 31 of the synchronization setting device 3 preferably reacquires the delay time Td in response to the change in the real delay time. In other words, the acquisition unit 31 preferably acquires the delay time Td dynamically in response to change in the real delay time. Further, the output unit 32 preferably outputs the delay time Td again to the automatic playing device 2 having been reacquired by the acquisition unit 31. The delay time Td can be acquired and can be output by the same methods as those of the first embodiment.

The distribution system and the control over the distribution system according to the first modification allow outputs of contents from the automatic playing device 2 (distribution source) and the distribution destination 11 to be timed to each other to be synchronized over an entire period of playing by the automatic playing device 2. Thus, more comfortable playing can be offered to a user at the distribution destination 11. Further, real-time acquisition and real-time output of the delay time Td by the synchronization setting device 3 achieve more comfortable playing.

1-4. Second Modification

Figure 4:
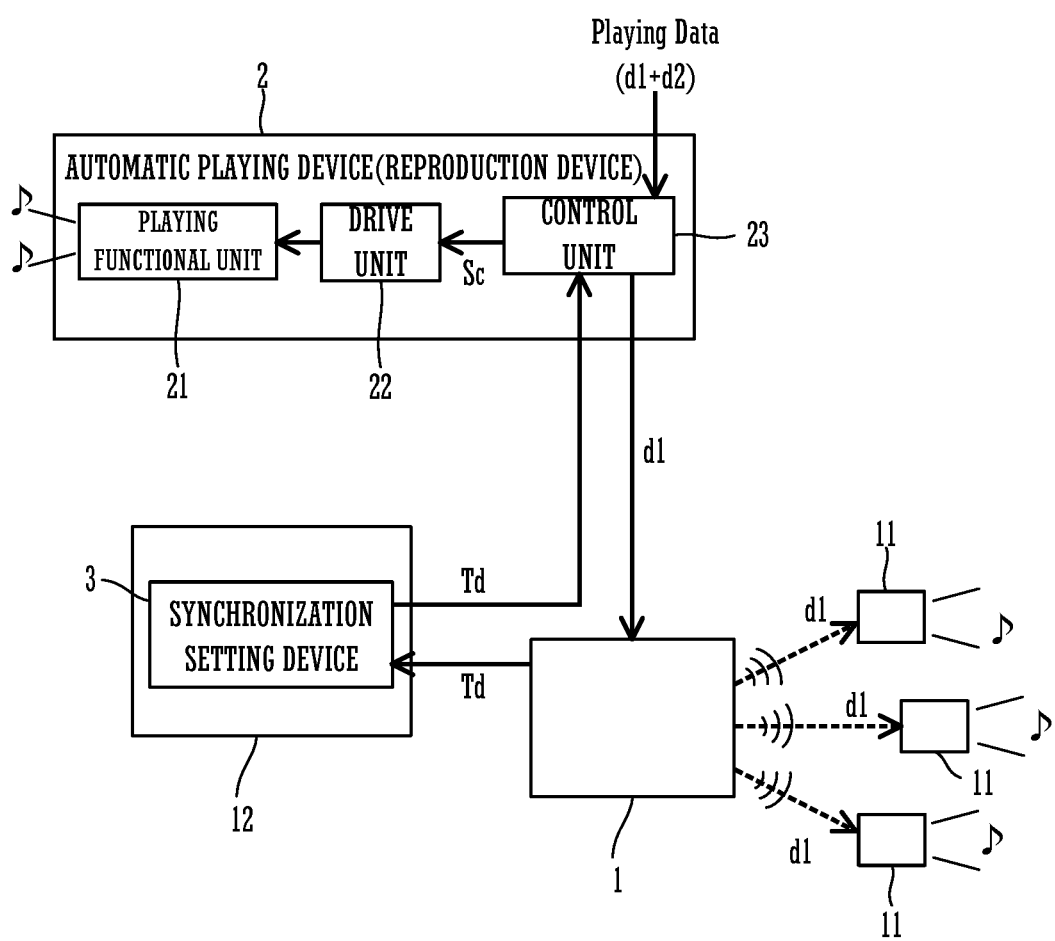
FIG. 4 is a conceptual view showing a distribution system according to a second modification.

FIG. 4 is a conceptual view showing a distribution system according to a second modification. As shown in FIG. 4, in the above-described distribution system according to the first embodiment, the synchronization setting device 3 can be realized in the controller 12 of a remote control over the distribution device 1.

Figure 5:
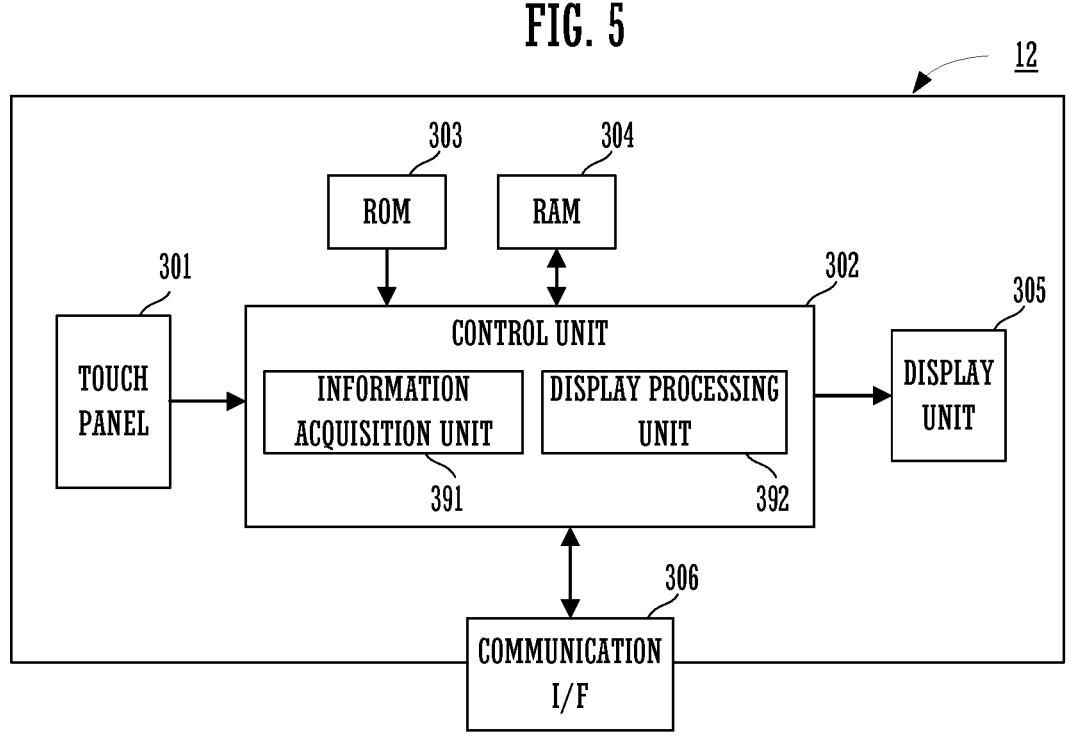
FIG. 5 is a block diagram showing the hardware configuration of a controller.

The controller 12 can have the same hardware configuration as the distribution device 1. Alternatively, as shown in FIG. 5, the controller 12 can be a mobile phone (information processing device), such as a smartphone, for example. The controller 12 includes a touch panel 301, a control unit 302, a ROM 303, a RAM 304, a display unit 305, and a communication I/F 306.

The touch panel 301 accepts operation by a user. The display unit 305, which can be a display device integrated with the touch panel, presents various types of information to the user. The control unit 302 performs various operations by reading an OS and an application program from the ROM 303 into the RAM 304. For example, when the user instructs the control unit 302 to start the application program through the touch panel 301, the control unit 302 starts the application program corresponding to the instruction and displays a screen for the application program on the display unit 305. In this case, the distribution system is controlled by following the application program.

The distribution system according to the second modification can be controlled in the same way as the distribution system according to the above-described first embodiment.

The first content data d1 and the second content data d2 can relate to the same content. Alternatively, the first content data d1 and the second content data d2 can relate to different contents, such as a piano part (melody part) and an accompaniment part as described above, as long as these contents are associated with each other.

The distribution device 1 can distribute only the first content data d1 (a digital audio signal corresponding to an accompaniment part) to the distribution destination 11 installed in the same space (such as a room) as the automatic playing device 2. The distribution device 1 can distribute a digital audio signal obtained from a sound source (not shown in the drawings) based on all pieces of data including a melody part and the accompaniment part to the distribution destination 11 installed in a different space from the automatic playing device 2.

2. Second Embodiment

A second embodiment is intended to solve the following problem. As has been the case in recent years, a reproduction device for reproduction of content data provides the content data to each of a plurality of distribution devices. In this case, in each of the distribution devices, outputs of contents from the distribution device and a distribution destination to which the provided content data is distributed are timed to each other to be synchronized. In some cases, however, synchronization is lost between the distribution devices. If delay time set in one distribution device (first distribution device) for establishing synchronization with a corresponding distribution destination is 500 ms while delay time set in a different distribution device (second distribution device) for establishing synchronization with a corresponding distribution destination is 100 ms, for example, synchronization is lost between the first distribution device and the second distribution device.

A synchronization setting device according to the second embodiment includes an acquisition unit and an output unit. The acquisition unit and the output unit are realized by at least one processor (for example a CPU). The acquisition unit acquires a first delay time and a second delay time. The first delay time is set in the first distribution device for distribution of first content data. The second delay time is set in the second distribution device for distribution of second content data. The output unit outputs the first delay time and the second delay time to the first distribution device, to the second distribution device, or to a reproduction device that gives the first content data to the first distribution device and the second content data to the second distribution device.

A distribution system according to the second embodiment includes the synchronization setting device, the first distribution device in which the first delay time is set for distribution of the first content data, the second distribution device in which the second delay time is set for distribution of the second content data, and the reproduction device that provides the first content data to the first distribution device and the second content data to the second distribution device. The synchronization setting device includes the acquisition unit that acquires the first delay time and the second delay time, and the output unit. The output unit outputs the first delay time and the second delay time to the first distribution device, to the second distribution device, or to the reproduction device. The first distribution device, the second distribution device, or the reproduction device receives the first delay time and the second delay time output from the synchronization setting device, and executes synchronization processing of timing an output of a content relating to the first content data and an output of a content relating to the second content data to each other based on the first delay time and the second delay time, thereby synchronizing the outputs.

In the distribution system described above, each of the first distribution device and the second distribution device can be a master of a network audio system for distributing an audio content through a network. The reproduction device can be an automatic playing device.

2-1. Configuration of Distribution System

Figure 6:
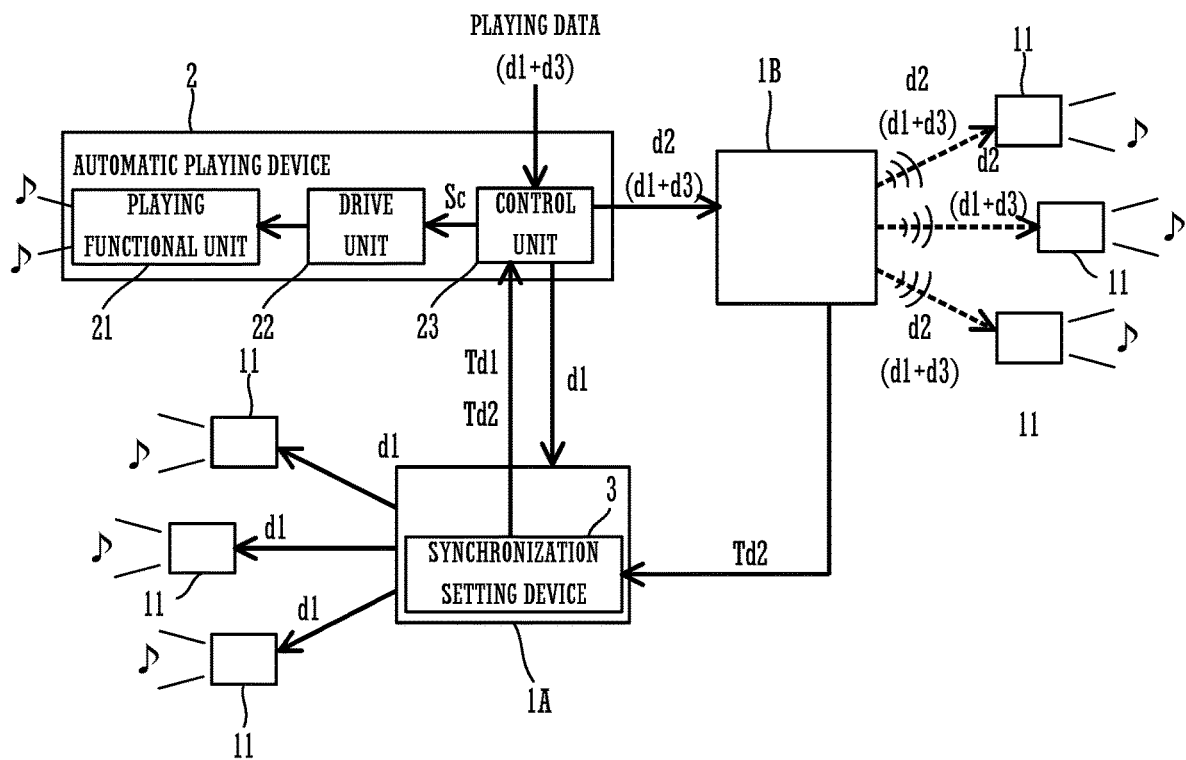
FIG. 6 is a conceptual view showing a distribution system according to a second embodiment.

FIG. 6 is a conceptual view showing the configuration of the distribution system according to the second embodiment. Structures common to those of the first embodiment are identified by the same signs and will not be described. Each of a first distribution device 1A and a second distribution device 1B has the same configuration as the distribution device 1 shown in FIG. 1. In the embodiment of FIG. 6, the synchronization setting device 3 is incorporated in at least one of the distribution devices 1A, 1B. In the illustration in FIG. 6, the synchronization setting device 3 is incorporated in the first distribution device 1A to which the first content data is to be provided.

According to the second embodiment, a digital audio signal corresponding to an accompaniment part is provided as the first content data d1 to the distribution device (first distribution device) 1A installed in the same space as the automatic playing device 2. A digital audio signal (second content data d2) corresponding to all parts (including a melody part and the accompaniment part) is provided to the distribution device (second distribution device) 1B installed in a different space from the automatic playing device 2. The automatic playing device 2 plays automatically based on MIDI data (third content data d3) containing the melody part. The second content data d2 contains both the first content data containing the accompaniment part and the third content data containing the melody part.

2-2. Control Over Distribution System

Figure 7:
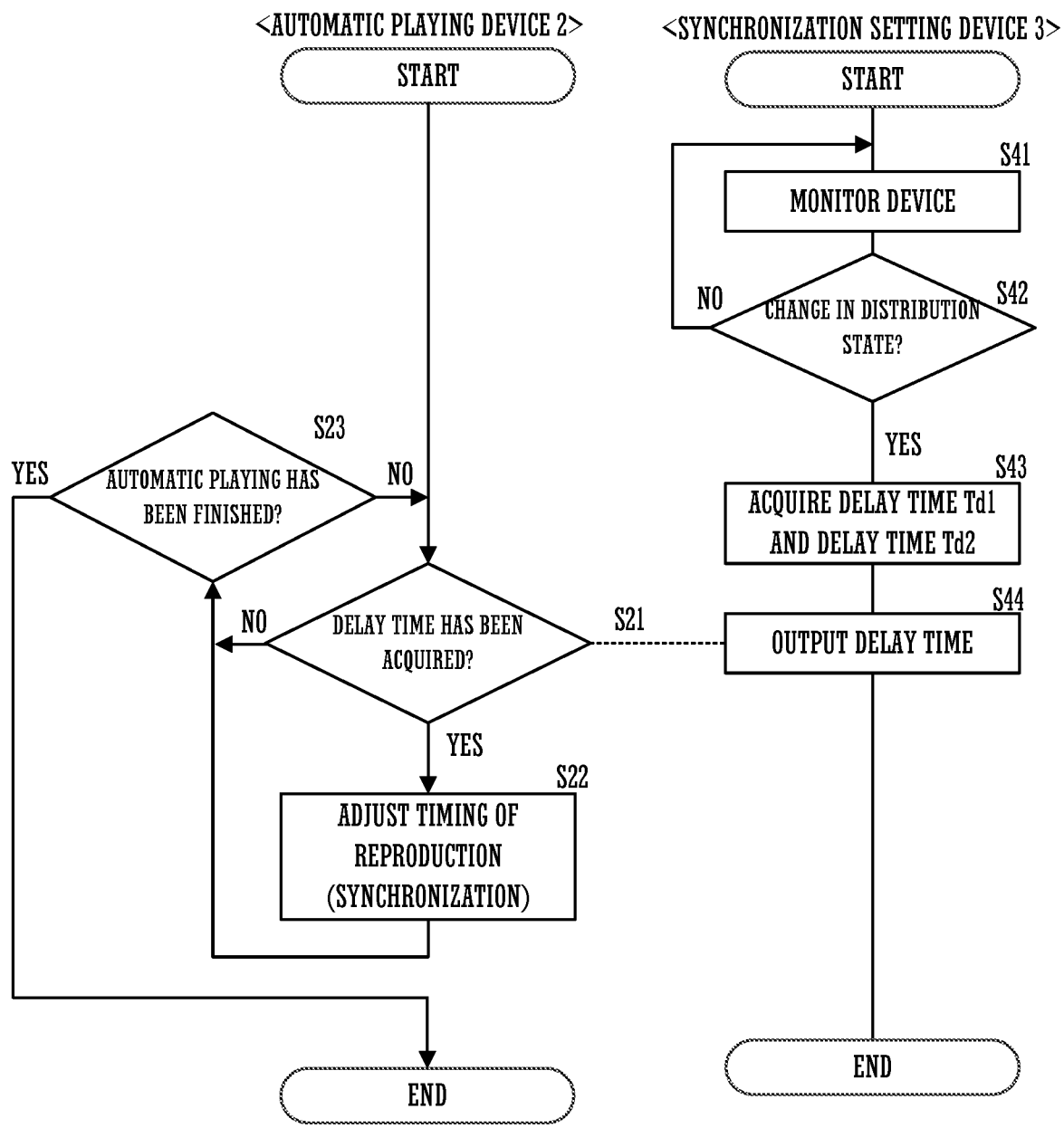
FIG. 7 is a flowchart showing control over the distribution system.

FIG. 7 is a flowchart showing control executed by the automatic playing device 2 and the synchronization setting device 3. First, in response to input of playing data, such as MIDI data to the automatic playing device 2, the automatic playing device 2 starts automatic playing processing. This starts the synchronization setting device 3 to start the synchronization setting processing.

When the synchronization setting processing is started, the synchronization setting device 3 monitors each distribution device to determine which distribution mode is set in each distribution device (step S41). As shown in FIG. 6, in the second embodiment, the first distribution device 1A includes the synchronization setting device 3. In this case, the synchronization setting device 3 determines a distribution mode in the first distribution device 1A to which the synchronization setting device 3 belongs. Further, the synchronization setting device 3 determines a distribution mode in the second distribution device 1B through a network, for example. As described above, the synchronization setting device 3 has identification information such as an Internet Protocol (IP) address or a MAC address of the second distribution device 1B connected to the network.

If a state of distribution in the first distribution device 1A or in the second distribution device 1B changes, or at the time of initial setting (step S42: YES), the synchronization setting device 3 acquires the first delay time Td1 and the second delay time Td2.

The delay time can be acquired directly from each distribution device. Alternatively, information indicating a distribution mode can be acquired from each distribution device and delay time in each distribution device can be estimated based on the acquired distribution mode. Distribution from each distribution device to each slave involves processing including the distribution from the master to the slave and reproduction by the slave, etc. This delays timing of output of sound from the slave from the timing of output of the sound from the master. Distribution through a wireless network involves processing, such as retransmission of a frame in response to failure to receive the frame correctly or processing such as retransmission of data in response to packet loss, for example. In either case, the timing of output of sound from the slave is delayed particularly seriously.

Each of the first distribution device 1A and the second distribution device 1B as a master stores an audio content in a buffer for a predetermined period of time to delay output of sound in order to establish synchronization between reproduction by the master and reproduction by a corresponding slave. Thus, the delay time can be set in a manner that depends on the capacity of the buffer necessary to establish synchronization with reproduction by the slave. In consideration of delay to be caused in the network connecting the master and the slave, the synchronous reproduction can also be realized by making the distribution device 1A or 1B adjust timing of start of distribution and timing of start of reproduction by the master. In this case, the delay time corresponds to a time lag between timing of start of distribution and timing of start of reproduction by the master. As described above, for distribution through a wireless network, delay time can be set at 500 ms. For distribution through a wired network, the delay time can be set at 100 ms. In response to the release mode, the delay time Td can be set at 0 (zero) ms. In the illustration of FIG. 6, distribution from the first distribution device 1A is wired distribution. Thus, the acquired first delay time Td1 can be 100 ms. Further, distribution from the second distribution device 1B is wireless distribution. Thus, the acquired second delay time Td2 can be 500 ms.

The synchronization setting device 3 outputs the acquired first delay time Td1 and the acquired second delay time Td2 to the automatic playing device 2 (reproduction device) and makes the automatic playing device 2 execute the synchronization processing (step S44). Specifically, if the delay time has been acquired (step S21), the automatic playing device 2 executes the synchronization processing based on the first delay time Td1 and the second delay time Td2 (step S22).

The automatic playing device 2 adjusts timing of reproduction of the third content data d3 based on the first delay time Td1 and the second delay time Td2. In the example described herein, to conform to 500 ms as the longest delay time in the second distribution device 1B, reproduction of a piano part is delayed 500 ms by delaying the timing of output of the control signal Sc or by mechanically delaying timing of moving hammers. The automatic playing device 2 adjusts the timing of providing the first content data d1 to the first distribution device 1A based on the first delay time Td1 and the second delay time Td2. The first delay time Td1 in the first distribution device 1A is shorter than the second delay time Td2 by 400 ms (determined by subtracting the first delay time Td1 from the second delay time Td2). Thus, the automatic playing device 2 provides the first content data d1 with a delay of 400 ms. Meanwhile, the automatic playing device 2 gives the second content data (d1+d3) to the second distribution device 1B with no delay time. The third content data d3 is MIDI data containing a melody part. Thus, the second content data to be actually provided to the second distribution device 1B is synthesized data containing a digital audio signal corresponding to piano sound resulting from conversion of the third content data d3 as MIDI data and the first content data d1 as a digital audio signal corresponding to an accompaniment part.

As a result, even if the automatic playing device 2 provides content data to a plurality of distribution devices, outputs of all contents still can be timed to each other to be synchronized.

2-3. First Modification

Figure 8:
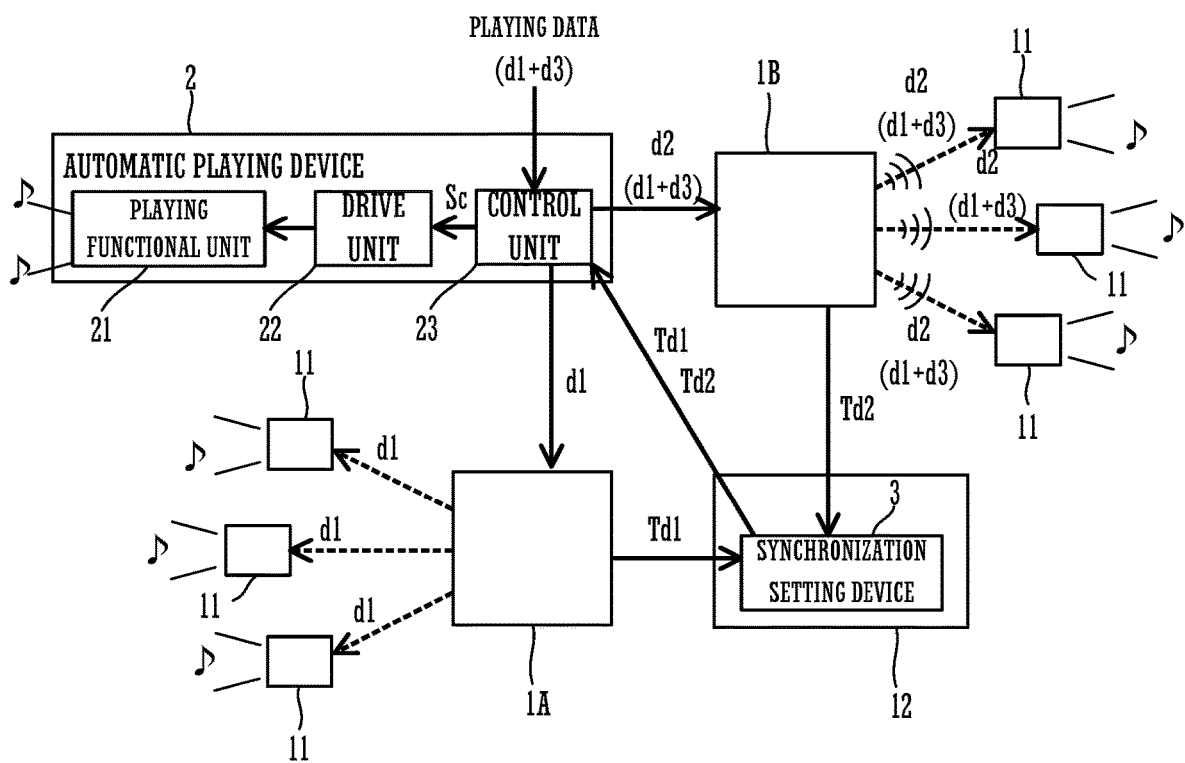
FIG. 8 is a conceptual view showing a distribution system according to a first modification of the second embodiment, where the synchronization setting device is provided in the controller.

As shown in FIG. 8, similar to the embodiment of FIG. 4, the synchronization setting device 3 can be realized in the controller 12 of a remote control, which can be a mobile phone. In this case, the controller 12 acquires the first delay time Td1 and the second delay time Td2 from the first distribution device 1A and the second distribution device 1B, respectively. Then, the synchronization setting device 3 outputs the first delay time Td1 and the second delay time Td2 to the automatic playing device 2 and makes the automatic playing device 2 execute the synchronization processing.

2-4. Second Modification

Figure 9:
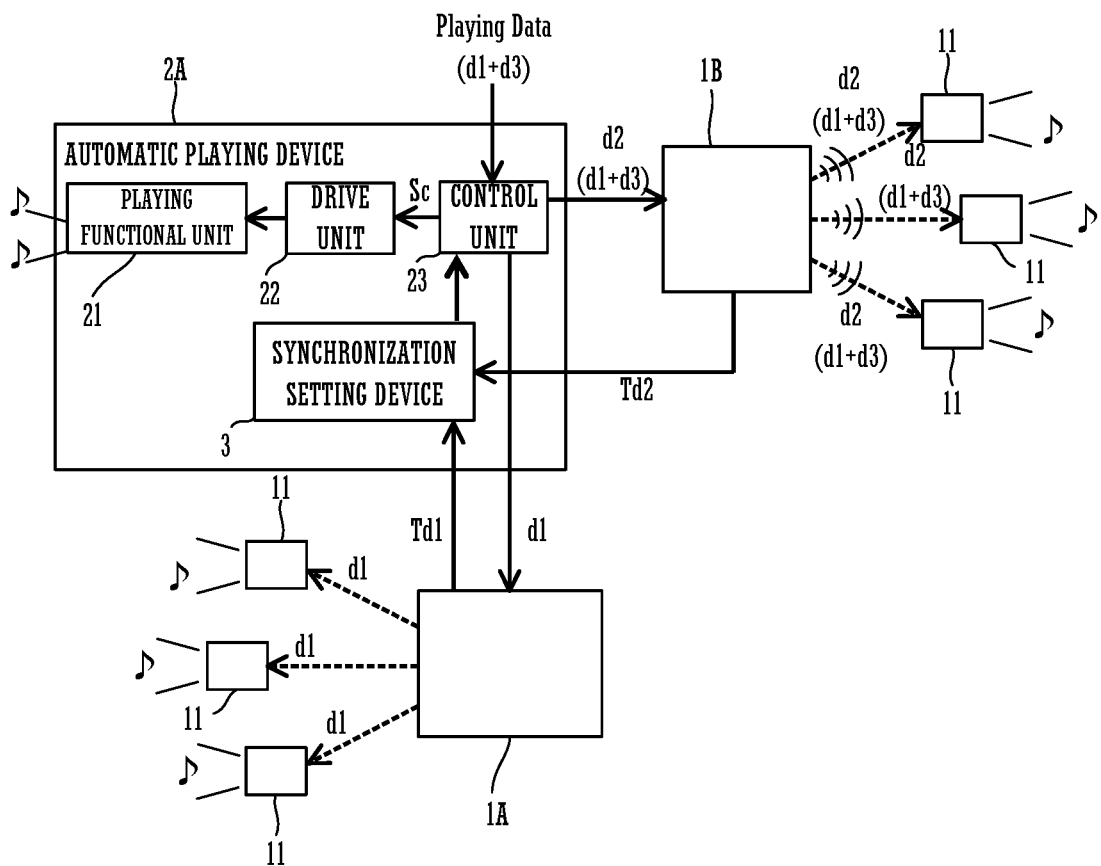
FIG. 9 is a conceptual view showing a distribution system according to a second modification of the second embodiment, where the synchronization setting device is provided in an automatic playing device.

As shown in FIG. 9, the synchronization setting device 3 can be incorporated in the automatic playing device 2. In this case, the automatic playing device 2 acquires the first delay time Td1 and the second delay time Td2 from the first distribution device 1A and the second distribution device 1B respectively. Then, the synchronization setting device 3 outputs the first delay time Td1 and the second delay time Td2 to the automatic playing device 2 to which the synchronization setting device 3 belongs and makes the automatic playing device 2 execute the synchronization processing.

In the above-described distribution system, the automatic playing device 2 as a reproduction device executes the synchronization processing by adjusting the timing of providing the first content data d1 to the first distribution device 1A based on the first delay time Td1 and the second delay time Td2.

2-5. Third Modifications

Figure 10:
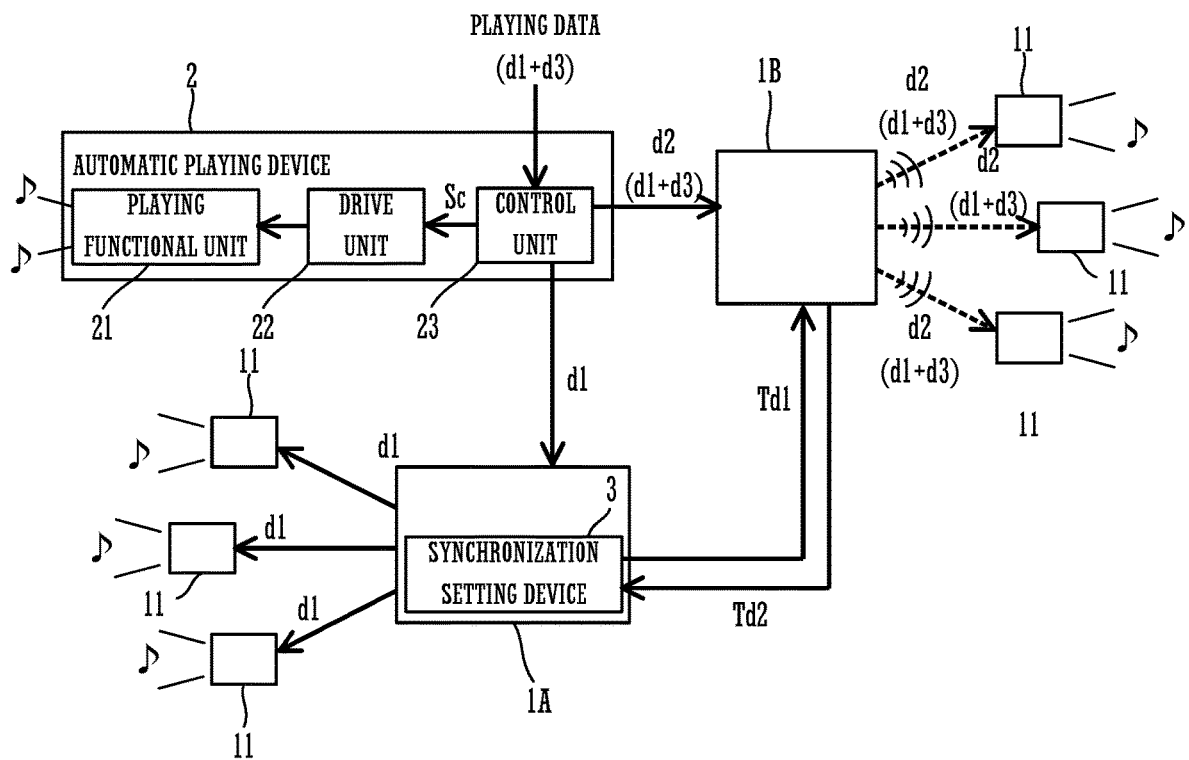
FIG. 10 is similar to the embodiment of FIG. 6, but illustrating the synchronization setting device outputting the delay time to a second distribution device instead of outputting to the reproduction device.
Figure 11:
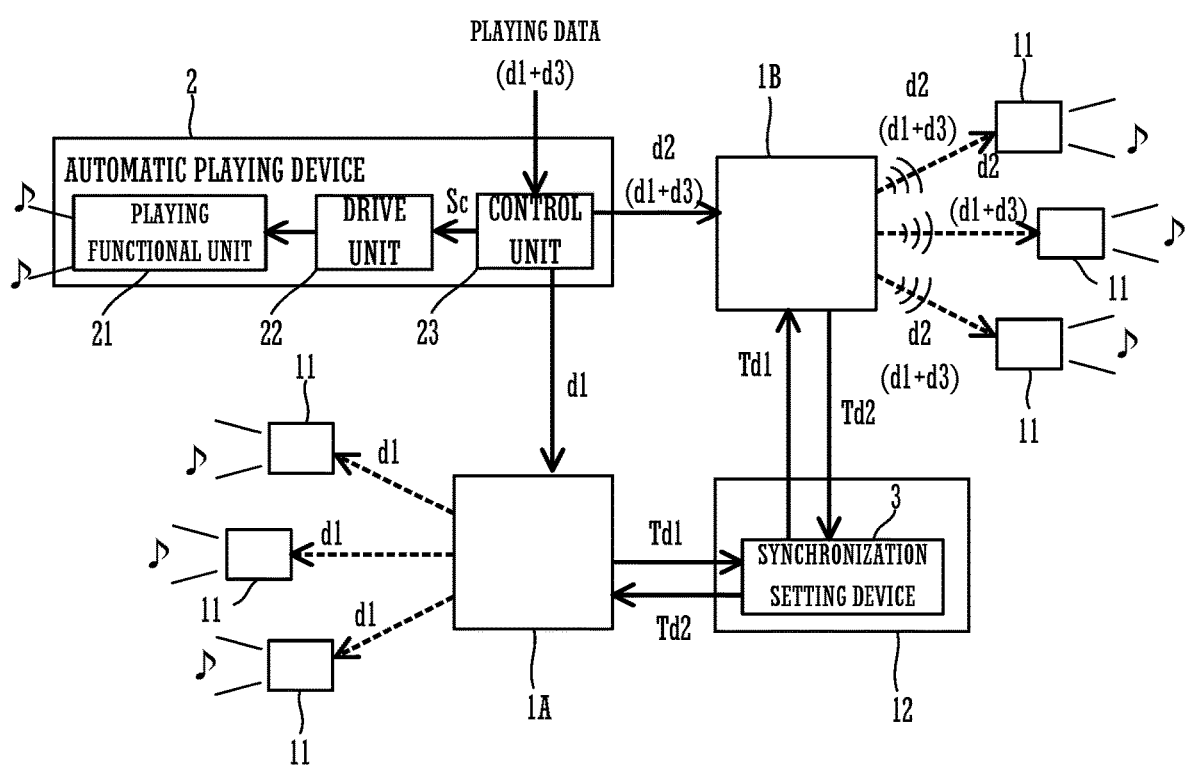
FIG. 11 is similar to the embodiment of FIG. 8, but illustrating the synchronization setting device outputting the respective delay times of the first and second distribution devices to each other instead of outputting the delay times to the reproduction device.
Figure 12:
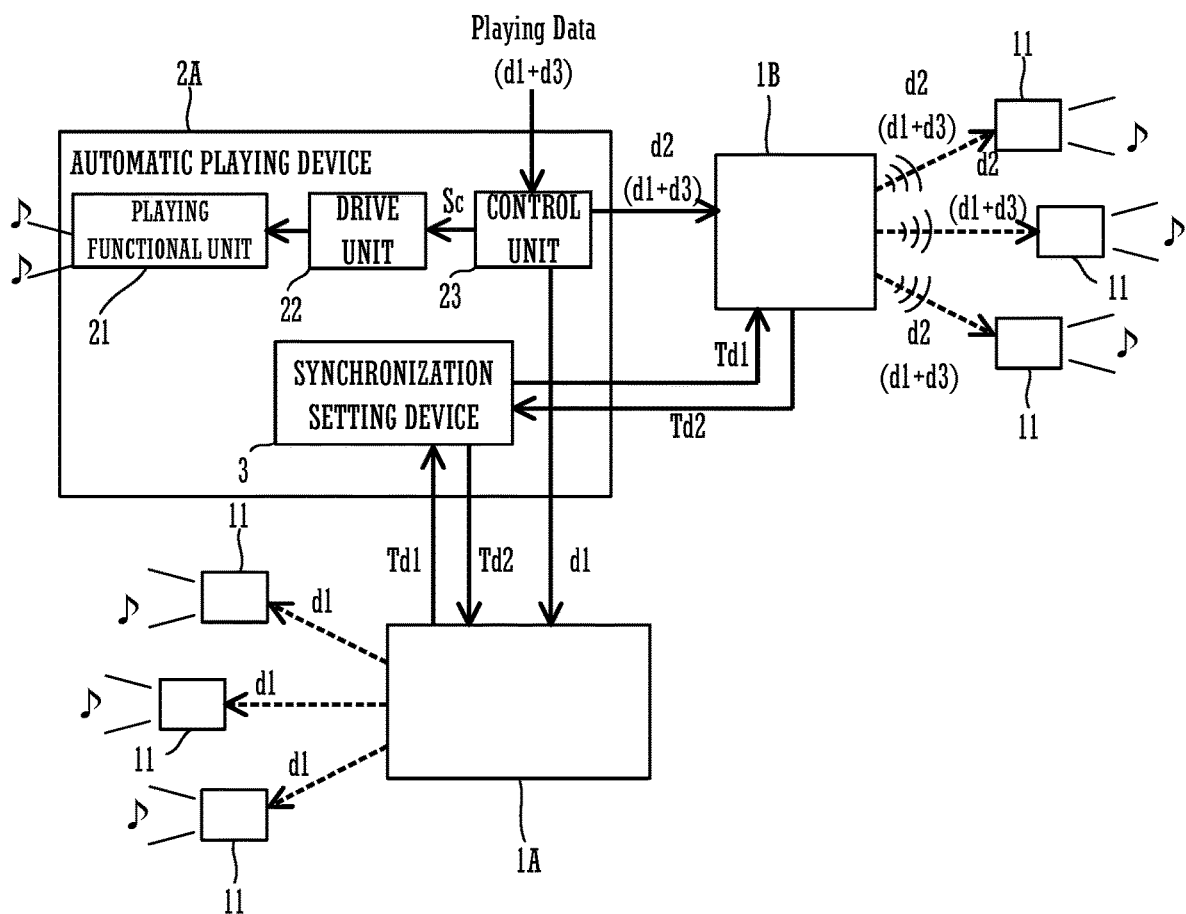
FIG. 12 is similar to the embodiment of FIG. 9, but illustrating the synchronization setting device outputting the respective delay times of first and second distribution devices to each other instead of outputting the delay times to the control unit of reproduction device.

Alternatively, referring to FIGS. 10-12, the first distribution device 1A can execute the synchronization processing by adjusting the delay time in the first distribution device 1A in consideration of the delay time in the second distribution device 1B, or vice-versa. In other words, any one of a plurality of distribution devices in the distribution system can execute the synchronization processing by adjusting the delay time in this distribution device based on longest delay time among delay times set in these distribution devices. In this respect, the synchronization setting device 3 outputs the delay times Td1, Td2 of other distribution devices in the distribution system to each of the distribution device 1A, 1B. That is, the first distribution device 1A receives the delay time Td2 of the second distribution device 1B, and the second distribution device 1B receives the delay time Td1 of the first distribution device 1A, instead of sending the delay times Td1, Td2 to the control unit 23 of the reproduction device 2. If delay time in the first distribution device 1A is the longest delay time, for example, the second distribution device 1B can adjust delay time in the second distribution device 1B in consideration of the delay time Td1 of the first distribution device 1A output by the synchronization setting device 3.

In the above-described embodiments, the reproduction device is the automatic playing device 2. Alternatively, the reproduction device is not limited to the automatic playing device 2 but it can also be a device such as a compact disk (CD) player, a digital versatile disc (DVD) player, or a television. In the first embodiment, the reproduction device provides reproduced content data to the distribution device 1. In the second embodiment, the reproduction device provides the first content data (voice in English, for example) of reproduced content data to the first distribution device 1A, and provides the second content data (voice in Japanese, for example) of the reproduced content data to the second distribution device 1B.

In the above-described embodiments, playing data, such as MIDI data is input to the automatic playing device 2. The playing data can also be input to the distribution device. In the first embodiment, data containing a melody part in the playing data to be played by the automatic playing device 2 is provided as the second content data d2 from the distribution device 1 to the automatic playing device 2. In this case, the first content data d1 containing an accompaniment part is converted to a digital audio signal at a sound source (not shown in the drawings) provided in the distribution device 1, and is then distributed. In the second embodiment, if the playing data is input to the second distribution device 1B, for example, data containing the accompaniment part is provided as the first content data d1 from the second distribution device 1B to the first distribution device 1A. Alternatively, the data containing the accompaniment part is converted to a digital audio signal at a sound source (not shown in the drawings) provided in the second distribution device 1B, and is then provided to the first distribution device 1A. The data containing the melody part is provided as the third content data d3 from the second distribution device 1B to the automatic playing device 2. The data containing the melody part and the data containing the accompaniment part are distributed as second content data converted to digital audio signals at the sound source (not shown in the drawings) provided in the second distribution device 1B.

It should be noted that the foregoing descriptions of the embodiments are in all aspects illustrative and not restrictive. The scope of the present invention is defined by the appended claims rather than by the embodiments described above. All modifications that fall within a meaning and a range equivalent to the scope of the claims are therefore intended to be embraced by the claims. For example, the number of the distribution devices can be three or more. In this case, the synchronization setting device further acquires third delay time in a third distribution device. Then, the synchronization setting device outputs the first delay time, the second delay time, and the third delay time to the first distribution device, to the second distribution device, to the reproduction device, or to the third distribution device. The synchronization processing is executed by any of the first distribution device, the second distribution device, the reproduction device, and the third distribution device.

What is claimed is:

1. A distribution system comprising:
    a synchronization setting device for synchronizing a reproduction device to synchronize reproduction of first audio content data and second audio content data, which includes content data not included in the first audio content data;
    a first distribution device to which a first delay time is settable for distribution of the first audio content data;
    a second distribution device to which a second delay time is settable for distribution of the second audio content data; and
    a reproduction device that provides the first audio content data to the first distribution device and the second audio content data to the second distribution device,
    wherein the synchronization setting device comprises:
        at least one first memory storing instructions; and
        at least one first processor configured to implement the stored instructions and execute:
            an acquiring task that acquires:
                the first delay time to be set in the first distribution device that distributes the first audio content data received from the reproduction device; and
                the second delay time to be set in the second distribution device that distributes the second audio content data received from the reproduction device; and
            an output task that outputs, to cause the reproduction device to synchronize reproduction of the first audio content data and the second audio content data:
                the first delay time and the second delay time to the reproduction device; or
                the first delay time to the second distribution device and the second delay time to the first distribution device, and
    wherein one of the reproduction device, the first distribution device, or the second distribution device includes:
        at least one second memory storing second instructions; and
        at least one second processor configured to implement the second instructions and execute:
            a synchronizing task that, upon receiving the first delay time and the second delay time output from the synchronization setting device, synchronizes reproduction of the reproduction device, an output of a content relating to the first audio content data output by the reproduction device, and an output of an audio content relating to the second audio content data output by the reproduction device, based on the received first delay time and the received second delay time.

2. The distribution system according to claim 1, wherein the output task outputting the first delay time and the second delay time to the reproduction device causes the reproduction device to synchronize reproduction of the first audio content data and the second audio content data.

3. The distribution system according to claim 1, wherein the first audio content data and the second audio content data contain contents associated with each other.

4. The distribution system according to claim 1, wherein the reproduction device also reproduces third content data associated with the first audio content data or the second audio content data.

5. The distribution system according to claim 4, wherein:
    the first audio content data or the second audio content data contains accompaniment information, and
    the third audio content data contains melody information.

6. The distribution system according to claim 5, wherein:
    the first audio content data is audio data generated from the accompaniment information, and
    the second audio content data is audio data generated from the melody information and the accompaniment information.

7. The distribution system according to claim 1, wherein:
    each of the first distribution device and the second distribution device includes a plurality of distribution modes, the plurality of distribution modes in the first distribution device are each settable to distribute the first audio content data, and the plurality of distribution modes in the second distribution device are each settable to distribute the second audio content data,
    in response to a first distribution mode set in the first distribution device, from among the plurality of distribution modes in the first distribution device, the acquiring task acquires the first delay time corresponding to the set first distribution mode, and
    in response to a second distribution mode set in the second distribution device, from among the plurality of distribution modes in the second distribution device, the acquiring task acquires the second delay time corresponding to the set second distribution mode.

8. The distribution system according to claim 7, wherein:
    the plurality of distribution modes included in each of the first and second distribution devices include a synchronization mode and a release mode, the synchronization mode being for establishing synchronization between a plurality of distribution destinations to which the first audio content data and the second audio content data are distributed, and the release mode being for releasing the distribution destinations from the synchronization, and
    the first delay time or the second delay time acquired by the acquiring task is settable to zero.

9. The distribution system according to claim 1, wherein the acquiring task reacquires the first delay time or the second delay time in response to change in the first delay time or in the second delay time.

10. The distribution system according to claim 1, wherein the synchronization setting device is provided in the first distribution device or in the second distribution device.

11. The distribution system according to claim 1, wherein:
- the first delay time is set in the first distribution device in response to time required to establish synchronization between reproduction by the first distribution device and reproduction by a slave as a distribution destination, and
- the second delay time is set in the second distribution device in response to time required to establish synchronization between reproduction by the second distribution device and reproduction by a slave as a distribution destination.

12. The distribution system according to claim 1, wherein each of the first and second plurality of distribution destinations comprises a plurality of speakers.

* * * * *